United States Patent [19]
Adachi et al.

[11] Patent Number: 5,058,017
[45] Date of Patent: Oct. 15, 1991

[54] SYSTEM FOR CONTROL OF VEHICLE SUSPENSION

[75] Inventors: Masao Adachi; Motohisa Funabashi, all of Sagamihara, Japan

[73] Assignee: Hitachi, Ltd., Tokyo, Japan

[21] Appl. No.: 266,074

[22] Filed: Nov. 2, 1988

[30] Foreign Application Priority Data

Nov. 5, 1987 [JP] Japan ................................ 62-279875

[51] Int. Cl.⁵ .......................................... B60G 17/00
[52] U.S. Cl. .................. 364/424.05; 280/707; 280/840; 280/703
[58] Field of Search .................. 364/424.05; 280/688, 280/689, 702, 703, 707, 708, 772, 773, 840

[56] References Cited

U.S. PATENT DOCUMENTS

| | | | |
|---|---|---|---|
| 4,761,022 | 8/1988 | Ohashi et al. | 280/707 |
| 4,789,935 | 12/1988 | Buma et al. | 364/424.05 |
| 4,821,191 | 4/1989 | Ikemoto et al. | 364/424.05 |
| 4,828,283 | 5/1989 | Ishii et al. | 364/424.05 |

FOREIGN PATENT DOCUMENTS

| | | |
|---|---|---|
| 114757 | 8/1984 | European Pat. Off. . |
| 166313 | 1/1986 | European Pat. Off. . |
| 236947 | 9/1987 | European Pat. Off. . |

OTHER PUBLICATIONS

SAE-Paper No. 840,342, 1985, pp. 741-2.753, "19 4 Continental Mark VII/Lincoln Electronically-Controlled Air Suspension (EAS) System".

Automotive Engineer, vol. 9, No. 1, Feb.-Mar., 1984, pp. 56-57.

"Lotus' Active Suspension", A. Baker, Automotive Engineer, Feb./Mar. 1984.

Primary Examiner—Gary Chin
Attorney, Agent, or Firm—Fay, Sharpe, Beall, Fagan, Minnich & McKee

[57] ABSTRACT

In an active suspension control system for a vehicle, a unit for adjusting the distance between each wheel and the body, i.e., a vehicle body height adjusting unit is added to the conventional suspension using a spring and a damper in combination. Since the amount of adjustment to be done by the body height adjusting unit is determined in accordance with the cause of generation of such a vibration of the vehicle as pitching or rolling, the suspension control system further comprises sensors for detecting pitching and rolling angles of the vehicle, respectively, a sensor, associated with each wheel, for detecting a relative displacement in the distance between each wheel and the body and an arithmetic unit, for example, a microcomputer for determining the amount of adjustement by the body height adjusting unit on the basis of the output of each sensor. The arithmetic unit discriminates a cause from predeterminedly sorted causes on the basis of the detected pitching angle, rolling angle and distance displacement and determines a target value of the distance between each wheel and the body, that is, an amount of adjustment by the body height adjusting unit on the basis of the discriminated cause and the distance displacement.

6 Claims, 5 Drawing Sheets $dp = (dfl + dfr) - (drl + drr)$ $dr = (dfr + drr) - (dfl + drl)$

SYSTEM FOR CONTROL OF VEHICLE SUSPENSION

BACKGROUND OF THE INVENTION

This invention relates to a controller for a vehicle suspension and more particularly to an active suspension control system for a vehicle. This active suspension control system gives a driver good ride and handling.

An active syspension control system is described in, for example, Automotive Engineer, February/March 1984, pp. 56-57. This system is an active suspension system installed in a racing car and developed by Lotus (Britain). In this system, springs, dampers and anti-roll bars, all used in the conventional suspension, are not employed but instead pressure oil actuators fill the role of the springs and dampers to support the vehicle boby. Oil is permitted to enter or leave the pressure oil actuator by controlling a servo valve and an oil pump driver by part of the output of the engine. This active suspension system has a total weight of 40 Kg and requires 3.7 kW peak energy. In operation, a number of parameters, including longitudinal and lateral accelerations at the center of gravity of the body, relative displacement between the body and the wheel, longitudinal acceleration of the wheel and longitudinal load from the body, are detected and subjected to a sophisticated arithmetic processing at an electronic control unit to produce a command signal supplied to the servo valve which, in turn, controls the charging and discharging of oil to and from chambers above and below the actuator piston to optimize the body attitude, feeling of ride and handling (controllability). This system is on the one hand advantageous in improving the feeling of the ride, stability of the body attitude and in increasing the speed of the vehicle through corners. For example, the speed through corners can be as much as 10% with this system. However, the Lotus system is very complicated and expensive and consumes a large amount of power for driving the oil pump (a concomitant increase in energy consumption in the engine), thus facing difficulties in its application to automobiles produced on a mass production basis. The large energy consumption degrades fuel economy in the automobile.

SUMMARY OF THE INVENTION

An object of this invention is to provide an active suspension control system for an automobile which can be simplified in construction, can improve the fuel economy, and can improve the feeling of the ride and handling of the vehicle efficiently.

According to the invention, to accomplish the above object, a unit for adjusting the distance between each wheel and the body, referred to as a height controller hereinafter, is added to the conventional suspension having spring and damper arrangements. The amount of adjustment of the height controller is determined in accordance with the cause of the vibration that occurs in the automobile, such as pitching or rolling. Therefore, the suspension control system of this invention further includes sensors for detecting the pitching and rolling angles of an automobile, respectively, a sensor, associated with each wheel, for detecting a relative displacement in the distance between each wheel and the body and an arithmethic unit (for example, a microcomputer) for calculating the amount of adjustment needed for the height controller on the basis of the output of each sensor. The arithmetic unit discriminates a cause of the pitching and rolling from predeterminedly sorted causes on the basis of the detected pitching angle, rolling angle and distance displacement, and determines a target value of the distance between each wheel and the body, that is, an amount of adjustment for the height controller on the basis of the discriminated cause and the distance change.

With the above construction of the invention, the conventional suspension structure can be used. Consequently, most of the weight of the body is shared by the suspension structure to allow the height controller to have a small loading capacity, so that energy consumption in the pump adapted to drive the height controller can be minimized and the fuel economy affected little by the pump drive evergy. Further, since the number of parameters to be detected for the sake of efficient control can be reduced, the construction of the control system can be simplified.

DESCRIPTION OF THE PREFERRED EMBODIMENTS

Figure 1:
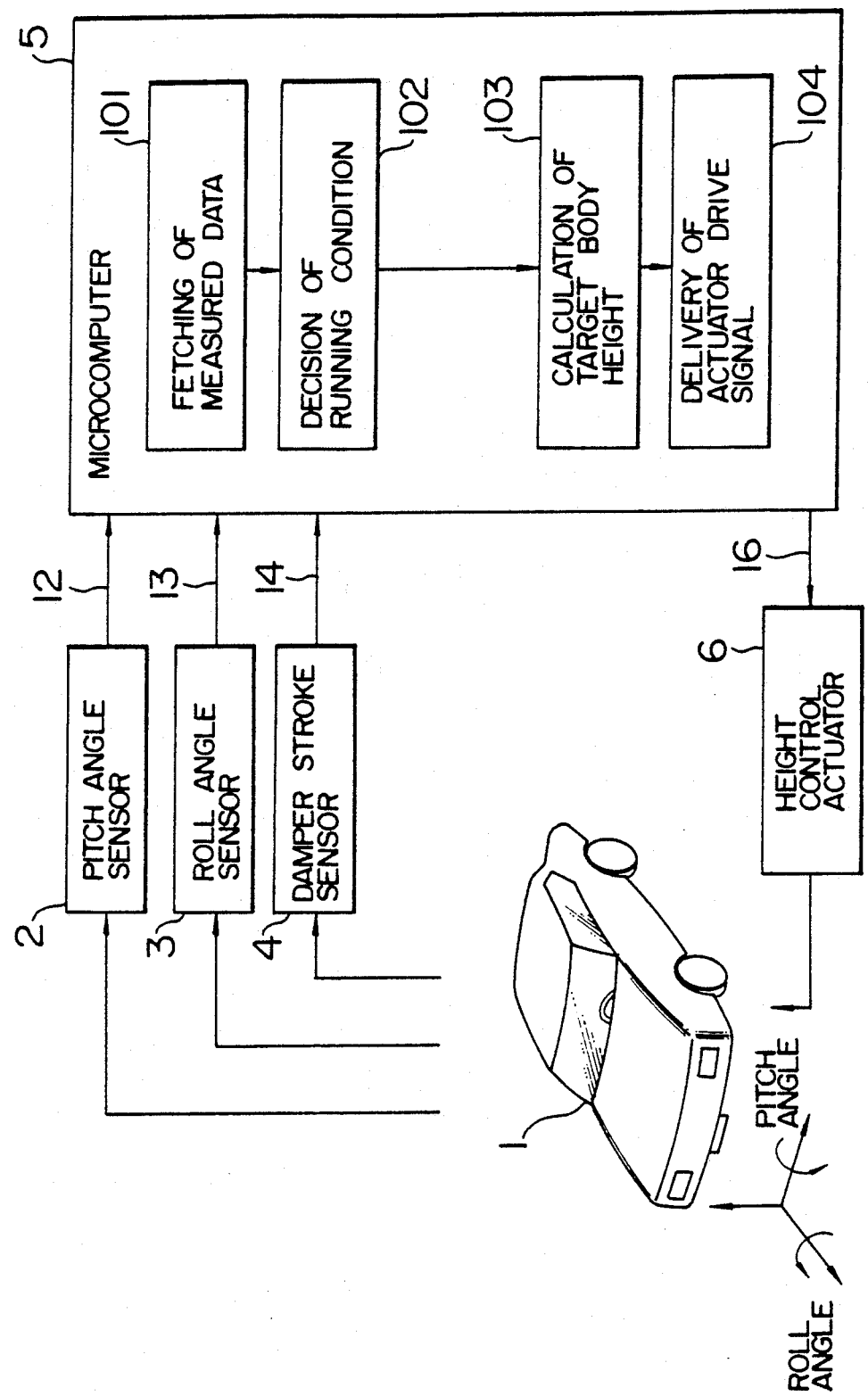
FIG. 1 is a block diagram illustrating an active suspension control system according to an embodiment of the invention.

FIG. 1 is a block diagram for explaining an active suspension control system for a vehicle according to an embodiment of the invention.

Referring to FIG. 1, the control system is operable to control a vehicle 1 and comprises a pitch angle sensor 2 for measuring pitch angles, a roll angle sensor 3 for measuring roll angles, a damper stroke sensor (height sensor) 4 for measuring damper stroke positions, a microcomputer 5 responsive to measured values of the sensors 2, 3 and 4 for performing various types of control, and a height control actuator 6 responsive to a command from the microcomputer 5 to change the height of the body. The sensors 2, 3 and microcomputer 5 are mounted to the body of the vehicle 1.

Suspension control will be described briefly with reference to FIG. 1. The pitch angle sensor 2 produces a measured value 12 indicative of a pitch angle of the body, the roll angle sensor 3 a measured value 13 indicative of a roll angle of the body and the damper stroke sensor 4 (associated with each of the four wheels) a measured value 14 indicative of a damper stroke position for each wheel. The microcomputer 5 fetches the output signals of these sensors every 0.001 second. A time series signal representative of the thus fetched data is processed by the microcomputer 5 to provide an actuator drive signal 16 supplied to the height control actuator 6 associated with each wheel. In response to the actuator drive signal 16, the height control actuator 6 associated with each of the four wheels changes the distance between each wheel and the body.

As an example of the pitch angle sensor 2 and roll angle sensor 3, an attitude angle sensor using a vertical gyroscope described in, for example, Automatic Control Handbook, issued by the Society of Instrument and Control Engineers in 1983, page 63 may conveniently be used. Alternatively, an acceleration sensor may be used and the output signal of the acceleration sensor may be subjected to an arithmetic processing to provide an angle representative of a change in the body attitude during pitching or rolling. As the damper stroke sensor 4 and height control actuator 6, the sensor and actuator described in, for example, SAE Paper No. 840342 may be used.

Figure 2:
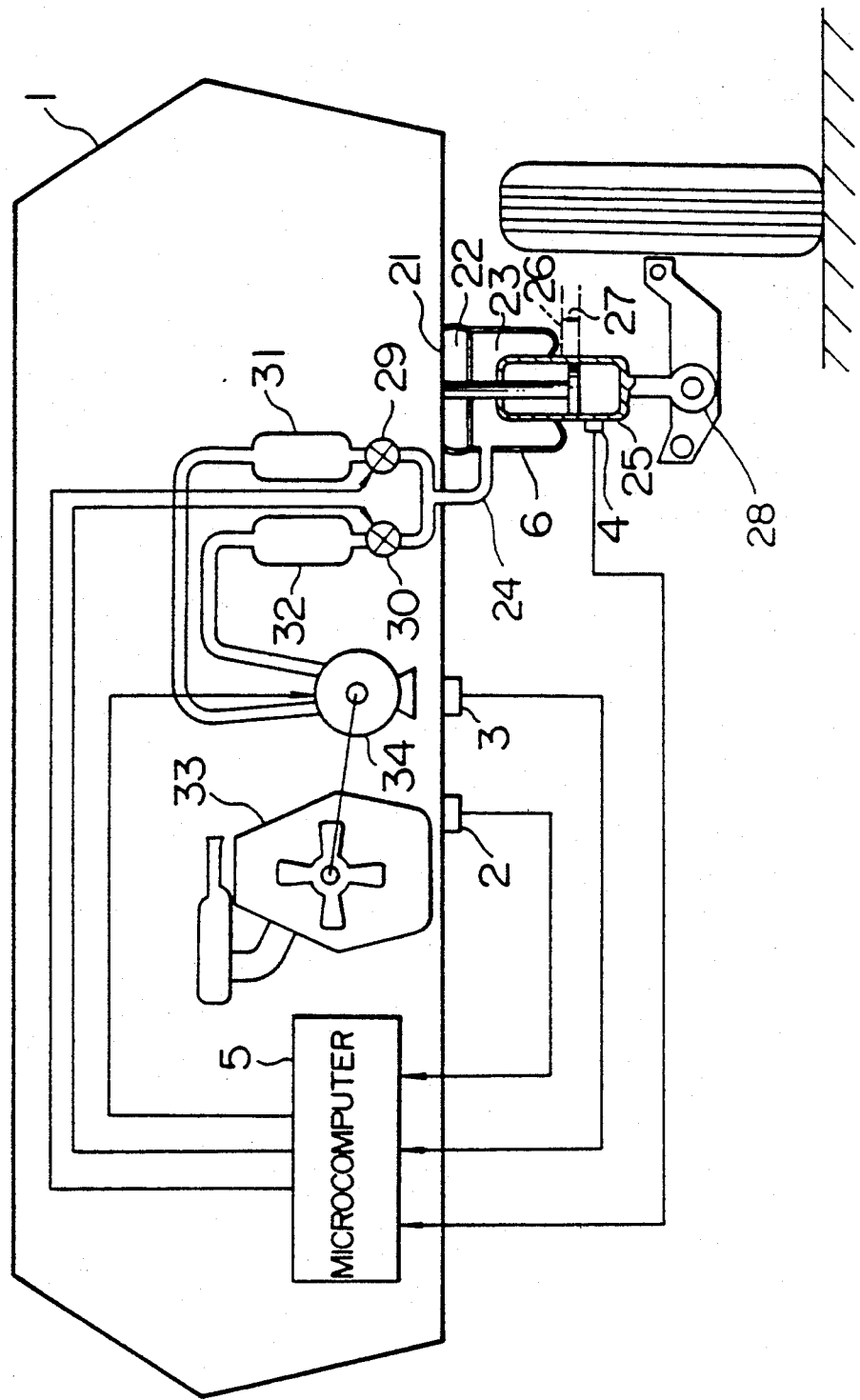
FIG. 2 is a diagrammatic representation of an embodiment of a suspension structure in the FIG. 1 active suspension control system.

Details of a suspension system of the invention associated with one wheel are exemplarily illustrated in FIG. 2. Essentially, suspension systems associated with the remaining three wheels have the same construction. Referring to FIG. 2, there are seen a connection 21 of the body, an air spring 22, an air chamber 23 for height control, an air charge/discharge pipe 24, a damper 25 and a connection 28 to the wheel (lower suspension arm). Reference numeral 26 indicates a damper stroke position when the vehicle keeps still with standard vehicle height. A displacement in damper stroke position is designated by 27.

The height control actuator according to the invention includes the air chamber 23 which shortens and lengthens like spring movements in the vertical direction of the vehicle by inflating or deflating with air, the air pipe 24, electromagnetic valves 29 and 30, a high-pressure air reservoir 31, a low-pressure air reservoir 32, and a compressor 34 driven by an engine 33. When the electromagnetic valve 29 associated with the high-pressure reservoir 31 is opened and while the electromagnetic valve 30 associated with the low-pressure reservoir 32 is closed, high-pressure air is fed to the air chamber 23 with the result that the air chamber 23 expands in the vertical direction to extend the distance between the body and the wheel. Conversely, when the electromagnetic valve 29 associated with the high-pressure reservoir 31 is closed and while the electromagnetic valve 30 associated with the low-pressure reservoir 32 is opened, air in the air chamber 23 is discharged to the low-pressure reservoir 32 with the result that the air chamber 23 contracts to shorten the distance between the body and the wheel. The air spring 22 and damper 25 have substantially the same construction and function as those of the conventional suspension. The air spring 22 used in this embodiment may be replaced with a coil spring, a leaf spring or a torsion bar spring.

Figure 3A:
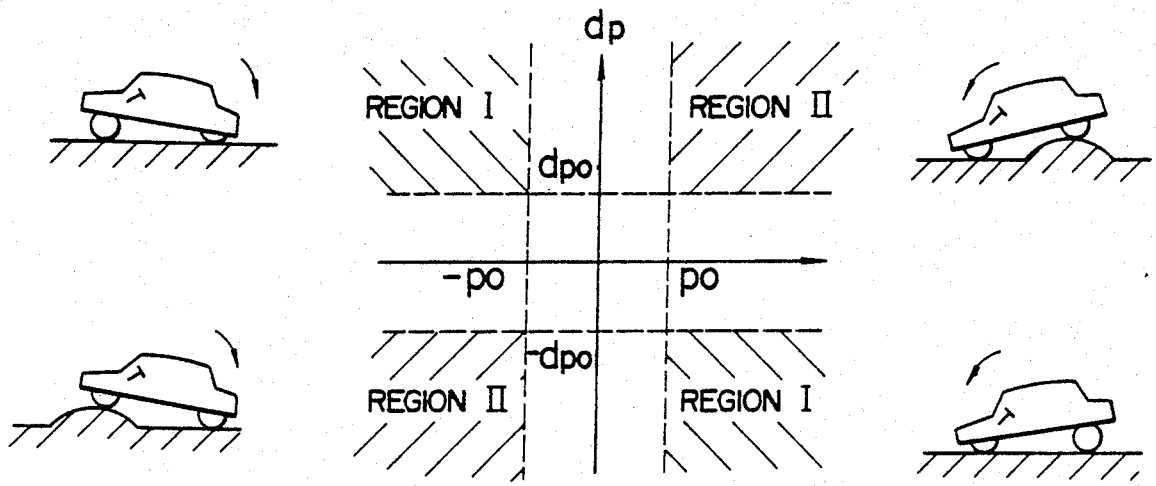
FIGS. 3A and 3B illustrate the relation between changes in the quantity representative of body attitude and changes in damper stroke.
Figure 3B:
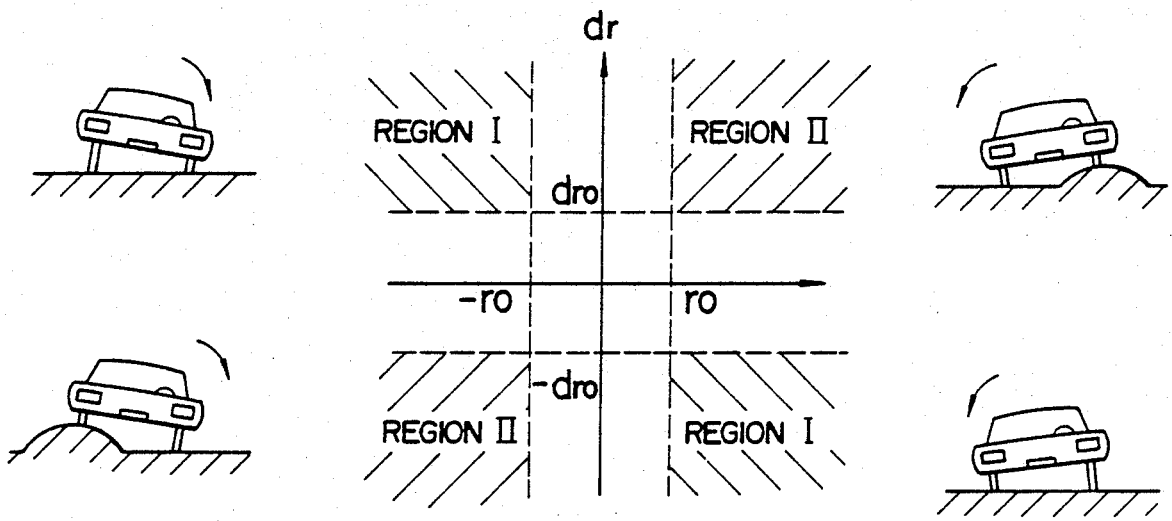

The relation between changes in attitude of the body (pitching and rolling) and a change in damper stroke is shown in FIGS. 3A and 3B. FIG. 3A shows how the pitching angle is related to a change in damper strokes and FIG. 3B shows how the rolling angle is related to a change in damper stroke. In FIGS. 3A and 3B, the abscissa represents the values of the pitching angle p and rolling angle r and the ordinate represents the resultant values dp and dr of the changes in the damper stroke (differences from the standard height 26 are positive valves above the reference attitude 26). Since changes in attitude of the front and rear portions of the body are represented by pitching, the resultant value dp of the changes in damper stroke concomitant with pitching, shown in FIG. 3A, is defined by the difference between changes in damper stroke for the front wheels and changes in damper stroke for the rear wheels as follows:

$$dp = (d_{fl} + d_{fr}) - (d_{rl} + d_{rr}) \quad (1)$$

where
- $d_{fl}$: a change in damper stroke for the front left wheel,
- $d_{fr}$: a change in damper stroke for the front right wheel,
- $d_{rl}$: a change in damper stroke for the rear left wheel, and
- $d_{rr}$: a change in damper stroke for the rear right wheel.

Similarly, since changes in attitude of right and left lateral portions of the body are represented by rolling, the resultant value dr of changes in damper stroke concomitant with rolling, shown in FIG. 3B, is defined by the difference between changes in damper stroke for the right wheels and changes in damper stroke for the left wheels as follows:

$$dr = (d_{fr} + d_{rr}) - (d_{fl} + d_{rl}) \quad (2)$$

In FIGS. 3A and 3B, threshold values lie on vertical and horizontal dotted lines. More specifically, po and −po are positive and negative threshold values for the pitching angle ro and −ro are positive and negative thresholds for the rolling angle, dpo and −dpo are positive and negative thresholds for the resultant value of the changes in damper stroke concomitant with pitching, and dro and −dro are positive and negative thresholds for the resultant value of changes in damper stroke concomitant with rolling. The threshold values are parameters in design of the control system and depend on the kind or type of vehicle. In FIGS. 3A and 3B, regions bounded by the dotted lines (thresholds) and hatched are sorted into regions I and II. Excepting the regions I and II, there is a region III which is a dead zone.

In the coordinates of FIG. 3A, region I in the second quadrant corresponds to either a state in which upon start of the vehicle, the rear portion of the vehicle body dives to cause the front portion of the body to move up or a state in which the rear wheel passes over a bump on a road surface and then bumps down. In this state, inertial kinetic energy of the vehicle body generates moment which moves the rear portion of the body down and as a result a negative (clockwise as viewed in the drawing), pitch takes place. In this condition of the region I, while the vehicle is on the move, it is desirable that the body height at the rear wheel be so controlled as to extend, from the standpoint of feeling of ride and handling. A region II in the third quadrant corresponds to either a state in which the front wheel encounters a bump or a state in which the rear wheel conversely encounters a chuckhole. In this state, a negative pitch takes place because of roughness in the road surface. In this region II, it is desirable that the body height at the front wheel be so controlled as to shorten and the body height at the rear wheels be so controlled as to extend. A region I in the fourth quadrant corresponds to either a state in which as a result of braking the vehicle, the front portion of the body dives to move the rear portion of the body up or a state in which the front wheel passes over a bump. In this state, inertial kinetic energy of the body generates moment which moves the front portion of the body down and consequently a positive (counterclockwise) pitch takes place. In this condition of the region I while the vehicle is on the move, it is desirable that the body height at the front wheel be so controlled as to extend. A region II in the first quadrant corresponds to either a state in which the rear wheel encounters a bump or a state in which the front wheel conversely encounters a chuckhole. In this state, a positive pitch takes place because of roughness in the road surface. In this region II, it is desirable that the body height at the rear wheel be so controlled as to shorten and the body height at the front wheel be so controlled as to extend.

In the coordinates of FIG. 3B, a region I in the second quadrant corresponds to either a state in which upon right turn of the vehicle, the outer wheel in turning (left wheel) bumps down and the inner body moves up or a state in which the left wheel passes over a bump and then the wheel bumps down. In this state, inertial kinetic energy of the body generates a moment which moves the inner portion (right portion) of the body up and consequently a negative (clockwise) roll occurs. In this condition of the region I while the vehicle is on the move, it is desirable that the body height at the left wheel be so controlled as to extend, from the standpoint of feeling of ride and handling. A region II in the third quadrant corresponds to either a state in which the right wheel encounters a bump or a state in which the left wheel conversely encounters a chuckhole. In this state, a negative roll takes place because of roughness on the road surface. In this region II, it is desirable that the body height at the right wheel be so controlled as to shorten and the body height at the left wheel be so controlled as to extend. A region I in the fourth quadrant corresponds to either a state in which upon left turn of the vehicle, the outer wheels (right wheels in turning) bump down and the inner body moves up or a state in which the right wheel passes over and then bumps down. In this state, inertial kinetic energy of the body generates a moment which moves the inner portion (left portion) of the body up and consequently a positive (counterclockwise) roll takes place. In this condition of the region I while the vehicle is on the move, it is desirable that the body height at the right wheel be so controlled as to extend. A region II in the first quadrant corresponds to either a state in which the left wheel encounters a bump or a state in which the right wheel conversely encounters a chuckhole. In this state, a positive roll occurs because of roughness in the road surface. In this region II, it is desirable that the body height at the left wheel be so controlled as to shorten and the body height at the right wheel be so controlled as to extend.

In the condition of the region III while the vehicle is on the move, the amount of pitching or rolling is either zero or not so large as to the effect the feeling of the ride or the handling and the body height need not be controlled.

The microcomputer 5 carries out the body height control processing as will be discussed in detail below. The block of microcomputer 5 shown in FIG. 1 gives an outline of a flow chart of a height control program.

In step 101, the measured value of the pitch angle 12 (p) of the body, the measured value of the roll angle 13 (r) and the measured value of the damper stroke position 14 for each of the four wheels are fetched every 0.001 second. The resultant value dp of the change in damper stroke concomitant with pitching and the resultant value dr of changes in damper stroke concomitant with rolling are calculated pursuant to equations (1) and (2).

In step 102, the fetched data and the resultant values dp and dr are used to determine the present running state of the vehicle and to decide on one particular running state from the following three categories.

(Category 1): Vibration mainly due to inertial kinetic energy of the body including rolling caused in turning, acceleration or deceleration, a residual vibration after the wheel has passed over a rough road, or vibration due to transverse wind.

(Category 2): Vibration due to displacement of a wheel by roughness in the road surface, such as a bump or a chuck-hole in the road surface.

(Category 3): No vibration

Specifically, the microcomputer comprises a memory having a sorting table reflecting regions I and II in FIGS. 3A and 3B and decides the category 1 for data in region I and the category 2 for data in region II. Subsequently, if data falling within neither region I nor region II are fetched sequentially, the microcomputer does not change its category decision for 0.5 seconds following deviation from the region I or II and at the expiration of 0.5 second, it decides that the running condition is in category 3.

Figure 4:
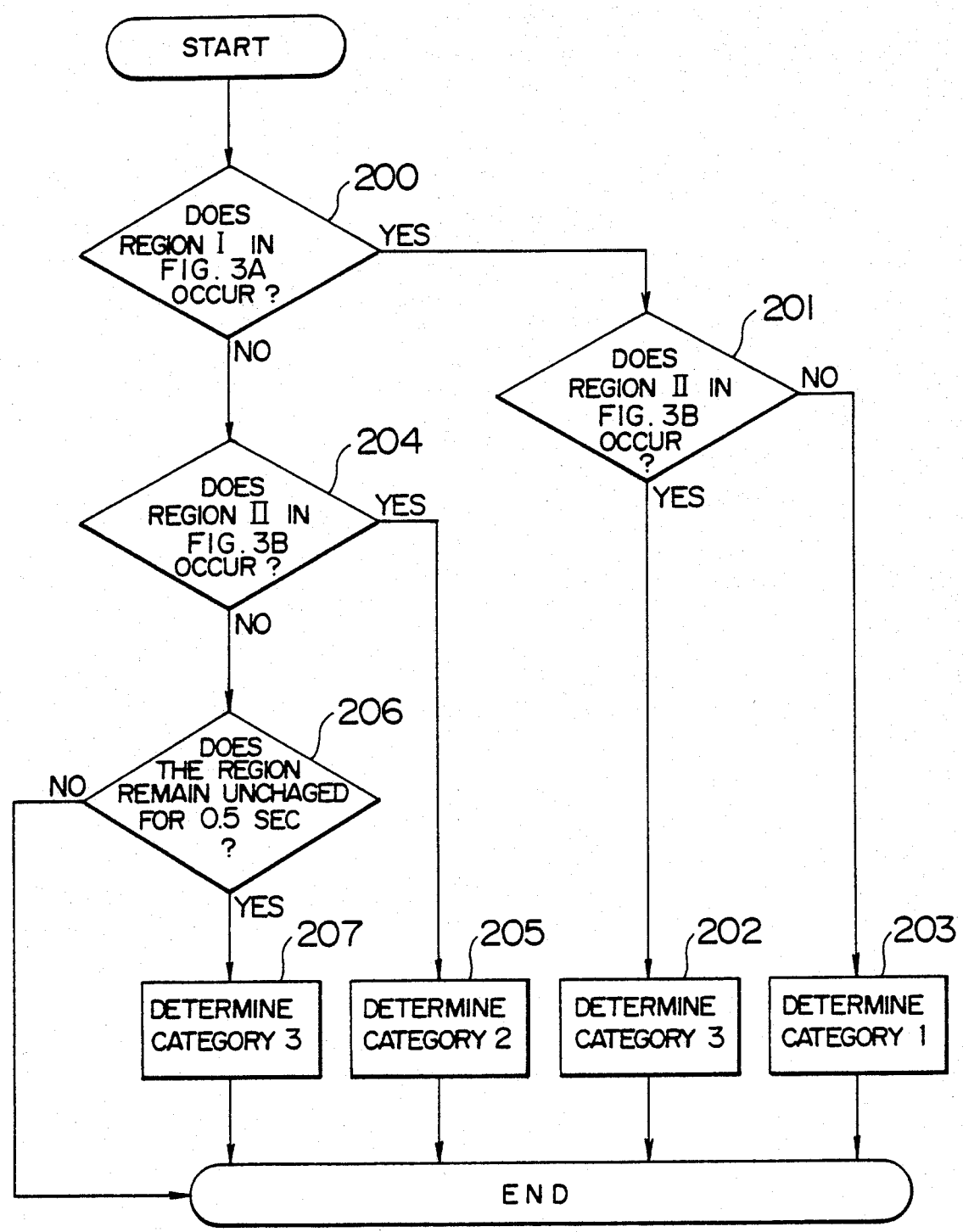
FIG. 4 is a flow chart showing a procedure for sorting causes of changes in attitude.

The running condition decision step 102 is particularly detailed in a flow chart as shown in FIG. 4. In step 200, it is decided whether a region I occurs by looking up the table for FIG. 3A. If yes, it is decided in step 201 whether a region II occurs by looking up the table for FIG. 3B. If the occurrence of the region II in FIG. 3B is determined in step 201, it is decided in step 202 that the state of the vehicle is in the category 3. If the occurrence of the region II in FIG. 3B is negated, it is decided in step 203 that the cause of the change in attitude of the vehicle falls within the category 1. If the occurrence of the region I in FIG. 3A is negated in step 200, it is decided in step 204 whether a region II in FIG. 3B occurs. If yes, the category 2 is determined in step 205. If the occurrence of the region II is negated in step 204, it is decided in step 206 whether the negation can persist for 0.5 second. If data falling within neither region I nor region II continues for more than 0.5 second, the category 3 is determined.

When the sorting of the cause of a change in attitude of the vehicle has been completed, a command value D for controlling the body height supported by each wheel is determined in step 103 for calculating a commanded relative body height, in a manner to be described below.

The equation of motion for the suspension system of each wheel is defined by the following equations:

$$m_i \ddot{z}_i = -C_i \dot{d}_i - K_i (d_i - u_i) \qquad (3)$$

$$m_{wi} \ddot{z}_{wi} = C_i \dot{d}_i + K_i (d_i - u_i) + f_i \qquad (4)$$

where each of the front left wheel (fl), rear left wheel (rl), rear right wheel (rr) and front right wheel (fr) is indicated in terms of a general character "i" and $d_i$: a change in damper stroke at wheel "i", $m_i$: a mass above the spring supported by a suspension at wheel "i", $m_{wi}$: a mass below the spring at wheel "i", $\ddot{z}_i$: a vertical acceleration of the sprung portion at wheel "i", $\ddot{z}_{wi}$: vertical acceleration of the unsprung portion at wheel "i", $f_i$: a change in force exerted by the road surface on the unsprung portion at wheel "i" (when the vehicle is at a standstill, $f_i=0$), $u_i$: ratio of the amount of air charged to and discharged from air chamber 23 to cross-sectional area of the air chamber, $C_i$: damping coefficient of the damper at wheel "i", and $K_i$: spring constant of the air spring at wheel "i".

By setting up $$u_i = d_i + \frac{C_i}{K_i} \dot{d}_i$$

for any changes in road surface, i.e., any changes in $f_i$, $\ddot{z}_i=0$ always stands to give a comfortable feeling of ride. But, in consideration of the handling, capacity of the actuator and external disturbance exerting the portion above the spring, $$u_i = \alpha d_i + \beta \cdot \frac{C_i}{K_i} \dot{d}_i$$

where $0<\alpha$ and $\beta<1$ is adapter. Design parameters $\alpha$ and $\beta$ of the control system are experimentally determined for different types of vehicle. By subjecting equations (3) and (4) conditioned by specified values of $u_i$, $\alpha$ and $\beta$ to difference approximation, the body height command value can be obtained for the categories 2 and 1 as follows:

(Category 2)

$$D_i = \alpha d_i(0) + \beta \cdot 10^3 \cdot \frac{C_i}{K_i} (d_i(0) - d_i(-1)) \quad (5)$$

(Category 1)

$$D_i = -\alpha d_i(0) - \beta \cdot 10^3 \cdot \frac{C_i}{K_i} (d_i(0) - d_i(-1)) \quad (6)$$

where $D_i$: an adjusting target value of relative body height at wheel "i", $d_i(0)$: a displacement in damper stroke occurring currently at wheel "i", and $d_i(-1)$: a displacement in damper stroke at wheel "i" 0.001 second before.

For the category 3, the body height control is not needed and $D_i=0$ stands.

In step 104 for delivering drive signals, a volume of the chamber 23 necessary to displace the damper stroke position in target height $D_{fl}$, $D_{fr}$, $D_{rr}$ or $D_{rl}$, and signals 16 are delivered by which the discharge valve 30 and charged valve 29 can be opened or closed to provide an amount of air corresponding to the determined volume.

Figure 5:
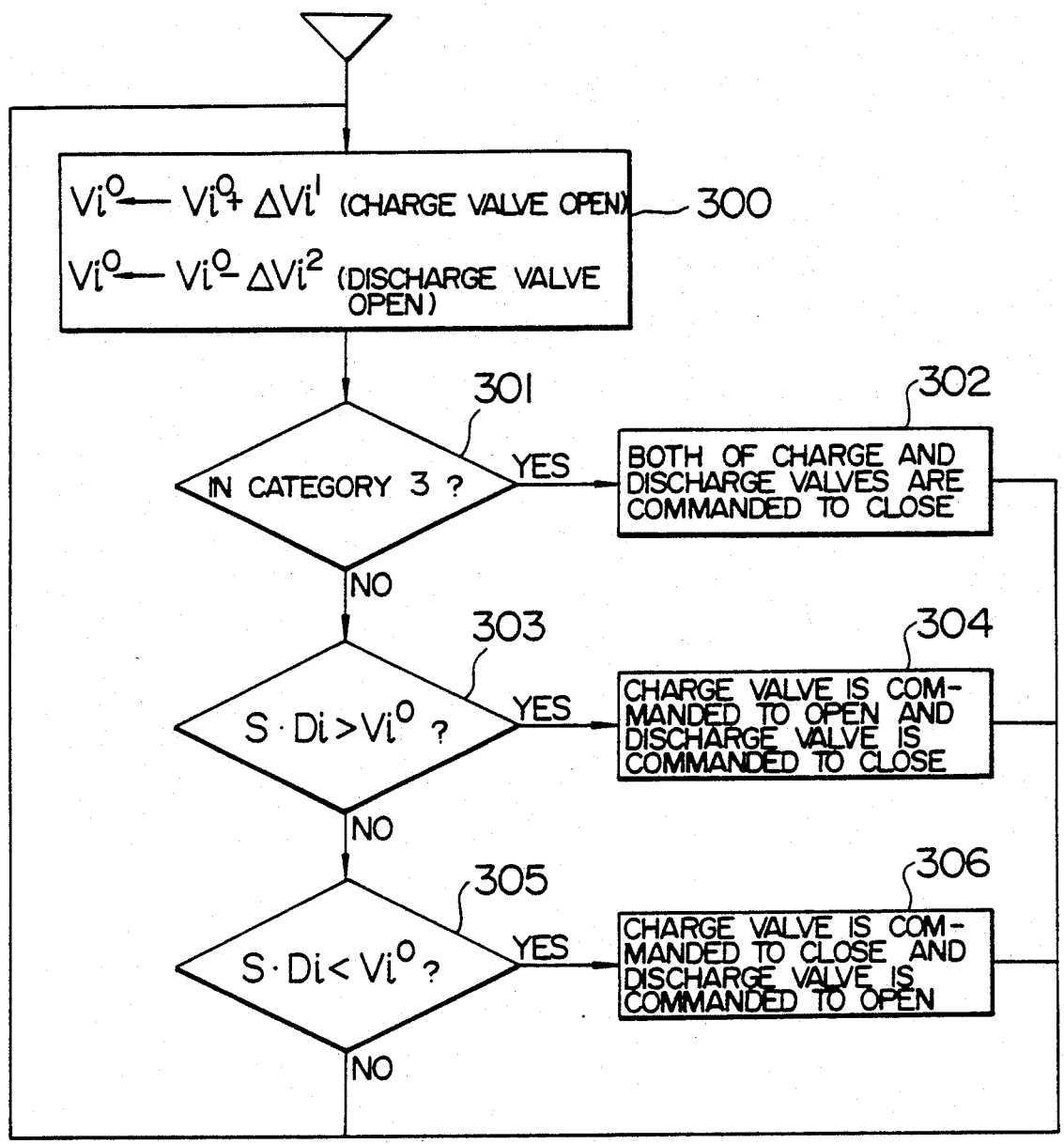
FIG. 5 is a flow chart showing a procedure for controlling the amount of air supplied to an air chamber of an actuator.

The volume $V_i$ of the air chamber 23 necessary for adjustment of $D_i$ is given by $$V_i = S \cdot D_i \quad (7)$$

where S is the cross-sectional area of the air chamber 23. The charge valve 29 and discharge valve 30 are opened or closed under the control of the microcomputer 5 in accordance with a flow chart of FIG. 5.

Immediately after start of the engine, the charge valve 29 and discharge valve 30 are both initialized to be closed and air charge/discharge cumulative value $V_i^0$ is set to zero. In step 300, the cumulative value $V_i^0$ during closure of the valves is determined. In step 301, it is decided whether running of the vehicle is placed in the condition of the category 3. If yes, closure of both the charge and discharge valves 29 and 30 are commanded in step 302 and adjustment of the body height is not carried out. If the category 3 is not determined in step 301, it is decided in step 303 whether the value $V_i^0$ is smaller than the target value $S \cdot D_i$. If the answer is yes, opening of the charge valve 29 and closure of the discharge valve 30 are commanded in step 304. In response to this command, air is charged into the air chamber 23 by an amount $\Delta V_i^1$. Conversely, if the value $V_i^0$ is decided to be larger than the target value $S \cdot D^1$ in step 305, a command is issued in step 306 to close the charge valve 29 and open the discharge valve 30. In response to this command, air is discharged from the air chamber 23 by an amount $\Delta V_i^2$. Through repetition of the above steps, a command amount of air $V_i$ is charged in the air chamber 23 to thereby provide the target body height $D_i$.

As described above, in the suspension control system according to the invention, the active suspension control can be performed using the actuator with small capacity and therefore the feeling of ride and handling can be improved without degrading the fuel economy. In addition, the present inventors have experimentally confirmed that even when using the low-capacity actuator, the system of the invention adopting the relative body height displacement/speed feedback design based on $D_i$ is more robust against delay in response of the actuator than the system adopting the design for feedback of vertical acceleration of the sprung portion.

We claim:

1. A control system for a vehicle suspension system having a combination of a spring and a damper which is associated with each wheel, said control system comprising:

first means for detecting at least one of a pitching angle and a rolling angle of said vehicle;

second means, associated with each wheel, for detecting a relative displacement in the distance between each wheel and a body of said vehicle;

means for discriminating a cause of pitching and rolling from among a plurality of predetermined sorted causes on the basis of the detected pitching angle, rolling angle and distance displacement;

means for determining a target value of the distance between each wheel and the body on the basis of said discriminated cause and said distance displacement;

means for adjusting the distance between each wheel and the body to said target value;

means for receiving said at least one of the pitching angle and the rolling angle detected by said detecting means;

said discriminating means including means for determining a plurality of regions corresponding to said sorted causes including a first region determined by a predetermined range of combinations of values of the pitching angle and said distance displacement, a second region determined by a predetermined range of combinations of values of the rolling angle of said vehicle and said distance displacement, and a third region determined by a predetermined range of combinations of values of one of the pitching angle and the rolling angle of said vehicle and said distance displacement that is not within the predetermined ranges of said first and second regions;

means for determining whether a combination of the detected values of said pitching angle and said rolling angle detected by said first detected means and said distance displacement detected by said second detecting means is within one of said regions, wherein one of said sorted causes corresponding to said one of said regions is said discriminated cause;

said first region corresponding to a first one of said sorted causes that relates to a motion change in the running of said vehicle and said second region corresponding to a second one of said sorted causes that relates to changes in a road surface encountered by said vehicle; and said target value determining means calculating target values in accordance with different target value determination equations.

2. A control system according to claim 1 wherein said target value determining means has means for calculating said target value which depends on said discriminated cause.

3. A control system according to claim 1 wherein said means for adjusting the distance to the target value comprises an air compressor, valves for controlling a pressurized air flow from said air compressor, and an actuator interposed between each wheel and the body and operable to change its height in response to charge/discharge of air to thereby change the distance between each wheel and the body, and closure/opening of said valves is controlled in accordance with target values delivered from said target value determining means.

4. A control system according to claim 1 wherein said means for detecting said distance displacement is a sensor for detecting a change in the stroke of said damper.

5. A control system according to claim 4 wherein said first means for detection of the pitching and rolling angles is a gyroscopic attitude sensor.

6. A control system according to claim 4 wherein said first means for detection of the pitching and rolling angles comprises an acceleration sensor and means responsive to an output of said acceleration sensor to calculate a direction of attitude change of said vehicle.

* * * * *